United States Patent
Zhao et al.

(10) Patent No.: US 11,414,618 B2
(45) Date of Patent: Aug. 16, 2022

(54) TRIBLOCK COPOLYMER CONCENTRATES FOR LUBRICATING OIL COMPOSITIONS

(71) Applicant: Infineum International Limited, Abingdon (GB)

(72) Inventors: Yi Zhao, Linden, NJ (US); Jun Cui, Linden, NJ (US); Stuart Briggs, Edison, NJ (US); Ewan Galbraith, Linden, NJ (US)

(73) Assignee: Infineum International Limited, Oxford (GB)

( * ) Notice: Subject to any disclaimer, the term of this patent is extended or adjusted under 35 U.S.C. 154(b) by 0 days.

(21) Appl. No.: 16/704,078

(22) Filed: Dec. 5, 2019

(65) Prior Publication Data

US 2021/0171853 A1 Jun. 10, 2021

(51) Int. Cl.

| | | |
|---|---|---|
| *C10M 143/12* | (2006.01) | |
| *C08F 8/04* | (2006.01) | |
| *C08F 236/06* | (2006.01) | |
| *C08F 236/08* | (2006.01) | |
| *C10M 169/04* | (2006.01) | |
| *C10N 40/04* | (2006.01) | |
| *C10N 40/25* | (2006.01) | |
| *C10N 20/02* | (2006.01) | |
| *C10N 20/04* | (2006.01) | |
| *C10N 30/02* | (2006.01) | |
| *C10N 60/02* | (2006.01) | |

(52) U.S. Cl.
CPC ............ *C10M 143/12* (2013.01); *C08F 8/04* (2013.01); *C08F 236/06* (2013.01); *C08F 236/08* (2013.01); *C10M 169/041* (2013.01); *C10M 2205/04* (2013.01); *C10M 2205/06* (2013.01); *C10N 2020/02* (2013.01); *C10N 2020/04* (2013.01); *C10N 2030/02* (2013.01); *C10N 2040/042* (2020.05); *C10N 2040/044* (2020.05); *C10N 2040/252* (2020.05); *C10N 2040/255* (2020.05); *C10N 2060/02* (2013.01)

(58) Field of Classification Search
CPC ............ C10M 143/12; C10M 169/041; C10M 2205/04; C10M 2205/06; C08F 8/04; C08F 236/08; C08F 236/06; C10N 2040/042; C10N 2020/02; C10N 2060/02; C10N 2030/02; C10N 2020/04; C10N 2040/255; C10N 2040/252; C10N 2040/044
See application file for complete search history.

(56) References Cited

U.S. PATENT DOCUMENTS

| | | |
|---|---|---|
| 4,788,361 A | 11/1988 | Olson et al. |
| 5,458,792 A | 10/1995 | Rhodes et al. |
| 9,133,413 B2 | 9/2015 | Oberoi et al. |
| 2013/0165362 A1* | 6/2013 | Oberoi ............... C10M 157/00 508/591 |
| 2018/0251701 A1 | 9/2018 | Taribagil |

OTHER PUBLICATIONS

European Search Report Application No. EP 3831913A1.

* cited by examiner

*Primary Examiner* — Taiwo Oladapo
(74) *Attorney, Agent, or Firm* — David M. Weisberg

(57) ABSTRACT

A VM concentrate comprising: from about 60 to about 95 parts (and at least 50 wt %) of a diluent oil (e.g., having a KV100 of about 2 cSt to about 40 cSt); and from about 5 parts to about 40 parts (and at least 6.0 wt %) of a linear triblock copolymer characterized by the formula: D'-PA-D"; wherein D' represents a block derived from diene, PA represents a block derived from monoalkenyl arene, D" represents a block derived from diene, and the linear triblock copolymer is present in an amount effective to modify a lubricating kinematic viscosity at approximately 100° C. (KV100) of the concentrate, and wherein the KV100 of the concentrate is about 3000 cSt or less. The linear triblock copolymer may additionally or alternatively have a thickening efficiency span of at most 0.5.

34 Claims, No Drawings

TRIBLOCK COPOLYMER CONCENTRATES FOR LUBRICATING OIL COMPOSITIONS

FIELD

Disclosed herein are triblock copolymers suitable for use as viscosity modifiers/viscosity index improvers for lubricating oil compositions including lubricating oil compositions for passenger car, heavy-duty diesel, and marine diesel engines, in functional fluids, such as manual/automatic transmission fluids. The triblock copolymers may be present in concentrate form, optionally with one or more other lubricant additives, or as a component in lubricating oil compositions and/or functional fluids. More specifically, certain linear triblock polymers may have a specific architecture and a desirable thickening efficiency (or span of thickening efficiencies in an array of basestocks), and concentrates incorporating such polymers may exhibit reasonable kinematic viscosities.

BACKGROUND

Lubricating oils for use in crankcase engine oils contain components that are used to improve the viscometric performance of the engine oil, i.e., to provide multigrade oils such as SAE 5W-XX and 10W-XX multigrade oils, where XX is 20, 30 or 40, or OW-XX grade oils, where XX is 08, 12, 16, or 20. These viscosity performance enhancers, commonly referred to as viscosity index improvers (VIIs), or viscosity modifiers (VMs), include olefin copolymers, polymethacrylates, styrene/hydrogenated diene block and star copolymers, and hydrogenated isoprene star polymers.

Olefin copolymers (or OCPs) that are used as viscosity index improvers conventionally comprise copolymers of ethylene, propylene and, optionally, a diene and provide a good thickening effect in oils at high temperature (thickening efficiency, or TE). Certain (co)polymers also provide excellent thickening efficiency and may be more durable in use (e.g., exhibit a higher shear stability index).

Star polymer-type VIIs am commercially available and a great deal of research has been done to develop star polymers providing the optimal balance of shear stability, solubility, and finishability, thickening efficiency and cold temperature properties. In some cases, star polymers may contain multi-block copolymer arms to tailor certain properties.

For example, U.S. Pat. No. 9,133,413 describes both star polymers and the linear triblock copolymer arms from which the star polymers are made as VIIs. Those triblock copolymer arms contain diene blocks having 5-35 wt %/65-95 wt % butadiene/isoprene (preferably 15-28 wt % butadiene). U.S. Pat. Nos. 4,788,361 and 5,458,792 also disclose symmetric triblock copolymers and asymmetric triblock copolymers, respectively, as potential VIIs/VMs.

VIIs are commonly provided to lubricating oil blenders as a concentrate in which the VII polymer is diluted in oil to allow, inter alia, for dissolution of the VII in the base stock oil. Because of limited solubility in certain diluent oils, linear alkenyl arene/hydrogenated diene block copolymer VM concentrates usually have lower active polymer concentrations and present greater handleability issues compared to star copolymer or olefin copolymer concentrates. Functionalization of the linear alkenyl arene/hydrogenated diene block copolymer further exacerbates the diluent solubility issues. A typical linear styrene/hydrogenated diene block copolymer VM concentrate may contain as little as 3 mass % active ingredient (AI/polymer, with the remainder being diluent oil), as higher concentrations of these polymers typically results in a reduction in the flowability of the concentrates at temperatures at which lubricants are blended. A typical formulated multigrade crankcase lubricating oil may, depending on the thickening efficiency (TE) of the polymer, require as much as 3 mass % of VM polymer. An additive concentrate providing this amount of polymer can introduce as much as 20 mass %, based on the total mass of the finished lubricant, of diluent oil.

As the additive industry is highly competitive from a pricing standpoint, and diluent oil represents one of the largest raw material costs to the additive manufacturers, VM concentrates have commonly contained the least expensive oil capable of providing suitable handling characteristics, usually a solvent neutral (SN) 100 or SN150 Group I oil. Using such conventional VM concentrates, the finished lubricant formulator has needed to add a quantity of relatively high-quality base stock oil (Group II or higher) as a correction fluid to insure the viscometric performance of the formulated lubricant remains within specification.

With regard to viscosity index improving polymers, increasing the viscosity index of the polymer is one of the few factors that can tend to influence fuel economy. Viscosity index, or VI, is an empirical number that depends on the kinematic viscosity of a material, as measured at 40° C. and 100° C., and is calculated in accordance with ASTM D2270. A higher VI may indicate a decreased change of viscosity with temperature and can correlate with improved fuel economy performance; specifically, a higher VI viscosity index improver may have a lower kinematic viscosity at 40° C., which can result in reduced frictional losses at low shear viscosities at 40° C., thereby contributing to improved fuel economy. For maximum fuel economy benefits, a viscosity index improver can provide a reduced viscosity contribution over a range of low and high shear regimes, and over the full range of operating temperatures.

As lubricating oil performance standards have become more stringent, there has been a continuing need to identify components capable of conveniently and cost effectively improving overall lubricant performance. Therefore, it would be advantageous to be able to provide a linear alkenyl arene/hydrogenated diene block copolymer VM concentrate that has an increased active ingredient (polymer) concentration while maintaining acceptable flow properties at temperatures at which lubricants are typically blended. It would also be advantageous for such a copolymer to provide a particular mix of advantageous properties, such as compositional flexibility, thickening efficiency, viscosity index, and perhaps most importantly the ability to thicken in concentrates without gelation, preferably relatively uniformly across different types or Groups of basestocks/diluents.

SUMMARY

In accordance with an aspect of the present disclosure, there is provided a class of polymers suitable for use as viscosity index improvers or viscosity modifiers for lubricating oil compositions, which polymers comprise linear triblock copolymers containing a block derived from monoalkenyl arene monomer (PA) positioned between two partially or fully hydrogenated blocks derived from diene (D' and D'). The VM concentrate may comprise: from about 60 parts to about 95 parts of a diluent oil; and from about 5 parts to about 40 parts of a linear triblock copolymer characterized by the formula: D'-PA-D". The linear triblock copolymer may be present in an amount effective to modify a lubricating kinematic viscosity at approximately 100° C.

(KV100) of the concentrate, which can comprise at least 50 wt % of the diluent oil and at least 6.0 wt % of the linear triblock copolymer. Advantageously, a KV100 of the diluent oil may be from about 2 cSt to about 40 cSt, the KV100 of the concentrate may be less than about 2000 cSt, and optionally the concentrate may have a ~80° C. beaker pour of at least 87% and/or a tan δ of at least 1.8.

Additionally or alternatively, the present disclosure provides a VM concentrate comprising: from about 60 parts to about 90 parts of a diluent oil; and from about 10 parts to about 40 parts of a linear triblock copolymer characterized by the formula: D'-PA-D". The linear triblock copolymer may be present in an amount effective to modify a KV100 of the concentrate, which can comprise at least 50 wt % of the diluent oil and at least 9.5 wt % of the linear triblock copolymer. Advantageously, a KV100 of the diluent oil may be from about 2 cSt to about 40 cSt, the KV100 of the concentrate may be less than about 3000 cSt, and optionally the concentrate may have a ~80° C. beaker pour of at least 85% and/or a tan δ of at least 1.5.

Further additionally or alternatively, the present disclosure provides a VM concentrate comprising: from about 60 parts to about 95 parts of a diluent oil; and from about 5 parts to about 40 parts of a linear triblock copolymer characterized by the formula: D'-PA-D". The linear triblock copolymer may be present in an amount effective to modify a KV100 of the concentrate and may exhibit a thickening efficiency span of at most 0.5, optionally with an average thickening efficiency in Group III diluent oil of at least 1.8. Advantageously, a KV100 of the diluent oil may be from about 2 cSt to about 40 cSt, the KV100 of the concentrate may be less than about 2000 cSt, and optionally the concentrate may have a ~80° C. beaker pour of at least 87% and/or a tan δ of at least 1.8.

In another aspect of the present disclosure, there is provided a method of modifying the kinematic viscosity at approximately 100° C. (KV100) of a concentrate according to one or more of the previous aspects, the method comprising adding to the concentrate an effective amount of a linear triblock copolymer according to the present disclosure. Relatedly, or as another aspect, linear triblock copolymers according to the present disclosure may have the use of controlling or reducing wear, e.g., in an automatic or manual transmission lubricated by a composition containing the linear triblock copolymers.

DETAILED DESCRIPTION OF THE EMBODIMENTS

Linear triblock copolymers of the present disclosure can be characterized by the formula:

D'-PA-D";

wherein D' represents a block derived from diene, PA represents a block derived from monoalkenyl arene, D" represents a block derived from diene but which is typically not identical to D' (in molecular weight, in chemical composition, or both).

VM concentrates of the present disclosure may be characterized by a lubricating kinematic viscosity at approximately 100° C. (KV100) and may contain: from about 60 parts to about 95 parts (e.g., from about 60 parts to about 90 parts) of a diluent oil; and from about 5 parts to about 40 parts (e.g., from about 10 parts to about 40 parts) of a linear triblock copolymer of the present disclosure. The diluent oil may advantageously comprise a majority of the concentrate (i.e., the concentrate comprises more than 50 wt % of the diluent oil component). Further, the linear triblock copolymer may advantageously be present in an amount effective to modify the KV100 of the concentrate.

For example, the effective amount may be such that the concentrate may include at least 5.5 wt % of the linear triblock copolymer (e.g., at least about 5.8 wt*, at least about 6.0 wt %, at least about 6.3 wt %, at least about 6.5 wt %, at least about 6.8 wt %, at least 7.0 wt %, at least 7.3 wt %, at least 7.5 wt %, at least about 7.8 wt %, at least about 8.0 wt %, at least about 8.3 wt %, at least about 8.5 wt %, at least 8.8 wt %, at least about 9.0 wt %, at least about 9.3 wt %, at least about 9.5 wt %, at least about 9.8 wt %, at least about 10 wt %, at least about 11 wt %, or at least about 12 wt %). Additionally or alternatively, the effective amount may be such that the concentrate may include up to about 40 wt % of the linear triblock copolymer (e.g., up to about 38 wt %, up to about 35 wt %, up to about 33 wt %, up to about 30 wt %, up to about 28 wt %, up to about 25 wt %, up to about 23 wt %, up to about 20 wt %, up to about 18 wt %, up to about 17 wt %, up to about 16 wt %, up to about 15 wt %, up to about 14 wt %, up to about 13 wt %, up to about 12 wt %, up to about 11 wt %, up to about 9.9 wt %, up to about 9.7 wt %, up to about 9.5 wt %, up to about 9.3 wt %, up to about 9.0 wt %, up to about 8.8 wt %, up to about 8.5 wt %, up to about 8.3 wt %, up to about 8.0 wt %, up to about 7.8 wt %, or up to about 7.5 wt %). In particular, the concentrate may include at least 6.0 wt %, at least 9.5 wt %, from 5.5 wt % to 14 wt %, from 6.0 wt % to 14 wt % or from 9.5 wt % to 14 wt %, of the linear triblock copolymer.

The KV100 of the concentrate, containing both the diluent oil component and the linear triblock copolymer, may advantageously be about 3000 cSt or less (e.g., about 2500 cSt or less, about 2000 cSt or less, about 1900 cSt or less, about 1800 cSt or less, about 1700 cSt or less, about 1600 cSt or less, about 1550 cSt or less, about 1500 cSt or less, about 1450 cSt or less, about 1400 cSt or less, about 1350 cSt or less, about 1300 cSt or less, about 1250 cSt or less, about 1200 cSt or less, about 1150 cSt or less, about 1100 cSt or less, about 1050 cSt or less, about 1000 cSt or less, about 950 cSt or less, about 900 cSt or less, about 850 cSt or less, about 800 cSt or less, about 750 cSt or less, about 700 cSt or less, or about 650 cSt or less). Optionally, the KV100 of the concentrate, containing both the diluent oil component and the linear triblock copolymer, may be at least about 100 cSt (e.g., at least about 200 cSt, at least about 300 cSt, at least about 400 cSt, at least about 500 cSt, at least about 550 cSt, at least about 600 cSt, at least about 650 cSt, at least about 700 cSt, at least about 750 cSt, at least about 800 cSt, at least about 850 cSt, at least about 900 cSt, at least about 950 cSt, at least about 1000 cSt, at least about 1050 cSt, at least about 1100 cSt, at least about 1150 cSt, at least about 1200 cSt, or at least about 1250 cSt). In particular, the KV100 of the concentrate may be about 3000 cSt or less, about 2000 cSt or less, about 1600 cSt or less, from 100 cSt to 3000 cSt, from 100 cSt to 2000 cSt, from 100 cSt to 1600 cSt, from 1000 cSt to 2000 cSt, or romm 500 cSt to 2000 cSt.

The D' and D" blocks derived from diene may be similar or different, but each D' and D" may individually comprise butadiene, isoprene, and mixtures thereof. In some embodiments, the D' and D" diene blocks may be mostly or substantially derived from isoprene monomers. For example, the D' and D" dienes may each individually comprise at least about 85 wt % isoprene (e.g., at least about 88 wt %, at least about 90 wt %, at least about 92 wt %, at least about 94 wt % at least about 96 wt %, at least about 97 wt %, at least about 98 wt %, at least about 99 wt %, at least about 99.5 wt %, or at least about 99.9 wt %) and/or not more than about 14 wt % butadiene (e.g., not more than about 12 wt %, not more than about 10 wt %, not more than about 8 wt %, not more than about 6 wt %, not more than about 4 wt %, not more than about 3 wt %, not more than about 2 wt %, not more than about 1 wt %, not more than about 0.5 wt %, or not more than about 0.1 wt %). In such embodiments, in particular, the D' and D" dienes may each individually comprise at least about 97 wt % isoprene and/or not more than about 3 wt % butadiene. Blocks D' and D" may advantageously be hydrogenated to remove at least about 80% (e.g., at least about 85%, at least about 90%, or at least about 95%) of polymerized diene unsaturations, and may be substantially or fully hydrogenated, typically after polymerization.

In other embodiments, at least one (or in some cases each) of diene blocks D' and D" may be copolymer blocks derived from mixed diene monomer, in which from about 65 wt % to about 95 wt % of the incorporated monomer units are from isoprene and from about 5 wt %, up to about 35 wt % of the incorporated monomer units are from butadiene, and wherein at least about 80 wt % (or at least 90 wt %) of butadiene is incorporated in a 1,4-configuration. In certain such embodiments, at least about 15 wt % of the incorporated monomer units may be butadiene monomer units and/or no greater than about 25 wt % of the incorporated monomer units may advantageously be butadiene monomer units. In such embodiments, at least one (or in some cases each) of diene blocks D' and D" may be random copolymer blocks.

Isoprene monomers used as the precursors of the linear triblock copolymers of the present invention can be incorporated into the triblock copolymer in either a 1,4- or 3,4-configuration, or as a mixture thereof. Preferably, the majority (i.e., greater than 50 wt %) of the isoprene may be incorporated into each individual block/copolymer as 1,4-units, e.g., greater than about 60 wt %, greater than about 70 wt %, greater than about 80 wt %, greater than about 90 wt %, greater than about 95 wt %, greater than about 97 wt %, greater than about 98 wt %, or greater than about 99 wt %, up to approximately 100 wt %. For example, from about 55 wt % to about 100 wt % (such as from about 60 wt % to about 100 wt %, from about 65 wt % to about 100 wt %, from about 70 wt % to about 100 wt %, from about 75 wt % to about 100 wt %, from about 80 wt/o to about 100 wt %, from about 85 wt % to about 100 wt %, from about 90 wt % to about 100 wt %, from about 95 wt % to about 100 wt %, from about 97 wt % to about 100 wt %, from about 98 wt % to about 100 wt %, or from about 99 wt % to about 100 wt %) of the isoprene units may be incorporated into each individual block/copolymer in a 1,4-configuration. An excessive amount of polybutadiene, particularly polybutadiene having a 1,2-configuration, in the D' and/or D" diene blocks can have an adverse effect on low temperature pumpability properties.

In many embodiments, the D' and D" blocks of the copolymer are not identical to each other in molecular weight, although they may be similar or identical in composition.

In a particular embodiment, the D' block may exhibit a number average molecular weight from about 62,000 Daltons to about 150,000 Daltons (e.g., from about 63,000 Daltons to about 120,000 Daltons or from about 63,000 Daltons to about 95,000 Daltons), and the D" block may exhibit a number average molecular weight from about 5,000 to about 80,000 Daltons (e.g., about 20,000 Daltons to about 75,000 Daltons).

In another particular embodiment, the D' block may exhibit a number average molecular weight from about 20,000 Daltons to about 60,000 Daltons (e.g., from about 25,000 Daltons to about 50,000 Daltons), and the D" block may exhibit a number average molecular weight from about 5,000 to about 40,000 Daltons (e.g., about 7,000 Daltons to about 20,000 Daltons).

In either or both of the aforementioned particular embodiments, the PA block may exhibit a number average molecular weight from about 8,000 Daltons to about 70,000 Daltons, e.g., from about 8,000 Daltons to about 60,000 Daltons, from about 8,000 Daltons to about 50,000 Daltons, from about 8,000 Daltons to about 40,000 Daltons, from about 8,000 Daltons to about 36,000 Daltons, from about 8,000 Daltons to about 35,000 Daltons, from about 8,000 Daltons to about 30,000 Daltons, from about 8,000 Daltons to about 25,000 Daltons, from about 10,000 Daltons to about 70,000 Daltons, from about 10,000 Daltons to about 60,000 Daltons, from about 10,000 Daltons to about 50,000 Daltons, from about 10,000 Daltons to about 40,000 Daltons, from about 10,000 Daltons to about 36,000 Daltons, from about 10,000 Daltons to about 35,000 Daltons, from about 10,000 Daltons to about 30,000 Daltons, from about 10,000 Daltons to about 25,000 Daltons, from about 15,000 Daltons to about 70,000 Daltons, from about 15,000 Daltons to about 60,000 Daltons, from about 15,000 Daltons to about 50,000 Daltons, from about 15,000 Daltons to about 40,000 Daltons, from about 15,000 Daltons to about 36,000 Daltons, from about 15,000 Daltons to about 35,000 Daltons, from about 15,000 Daltons to about 30,000 Daltons, from about 15,000 Daltons to about 25,000 Daltons, from about 20,000 Daltons to about 70,000 Daltons, from about 20,000 Daltons to about 60,000 Daltons, from about 20,000 Daltons to about 50,000 Daltons, from about 20,000 Daltons to about 40,000 Daltons, from about 20,000 Daltons to about 36,000 Daltons, from about 20,000 Daltons to about 35,000 Daltons, from about 20,000 Daltons to about 30,000 Daltons, from about 20,000 Daltons to about 25,000 Daltons, from about 25,000 Daltons to about 70,000 Daltons, from about 25,000 Daltons to about 60,000 Daltons, from about 25,000 Daltons to about 50,000 Daltons, from about 25,000 Daltons to about 40,000 Daltons, from about 25,000 Daltons to about 36,000 Daltons, from about 25,000 Daltons to about 35,000 Daltons, or from about 25,000 Daltons to about 30,000 Daltons. In particular, the PA block may exhibit a number average molecular weight from about 10,000 Daltons to about 40,000 Daltons, from about 15,000 Daltons to about 35,000 Daltons, from about 15,000 Daltons to about 50,000 Daltons, or from about 20,000 Daltons to about 36,000 Daltons.

Additionally or alternatively, in the linear triblock copolymers according to the present disclosure, a ratio of PA block number average molecular weight to a sum of D'+D" block number average molecular weights may be from about 0.25 to about 0.50, e.g., from about 0.25 to about 0.45, from about 0.25 to about 0.40, from about 0.25 to about 0.35, from about 0.25 to about 0.30, from about 0.30 to about 0.50, from about 0.30 to about 0.45, from about 0.30 to about 0.40, from about 0.30 to about 0.35, from about 0.35 to about 0.50, from about 0.35 to about 0.45, from about 0.35 to about 0.40, from about 0.40 to about 0.50, from about 0.40 to about 0.45, or from about 0.45 to about 0.50.

Further additionally or alternatively, in linear triblock copolymers according to the present disclosure, there may be a relationship between number average molecular weights of the diene blocks. For example, in an embodiment, a ratio between the D' block number average molecular weight and the D" block number average molecular weight may be above 1.00:1 up to about 1.25:1. However, in another embodiment, a ratio between the D' block number average molecular weight and the D" block number average molecular weight may be from about 1.4:1 to about 3.0:1. In yet another embodiment, a ratio between the D' block number average molecular weight and the D" block number average molecular weight may be from about 6.0:1 to about 30:1.

The term "number average molecular weight," as used herein, should be understood to refer to the number average molecular weight as measured by Gel Permeation Chromatography ("GPC," also known as Size Exclusion Chromatography, or "SEC") in tetrahydrofuran (THF) eluent at approximately 40° C. and using relatively monodisperse polystyrene standards. Molecular weights (e.g., number average molecular weights) of the diene blocks, D' and D", are reported herein as measured prior to any hydrogenation that may be done post-polymerization.

Suitable monoalkenyl arene monomers include monovinyl aromatic compounds, such as styrene, monovinyinaphthylene, as well as the alkylated derivatives thereof such as o-, m- and p-methylstyrene, alpha-methyl styrene, ethylstyrenes (in particular p-ethylstyrene), propylstyrenes (in particular p-isopropyistyrene), and tertiary butylstyrenes (in particular para-t-butylstyrene). In particular, the monoalkenyl arene may comprise or be styrene.

Linear triblock copolymers of the present disclosure may have a total number average molecular weight (additive combination of number average molecular weights of D', PA, and D" blocks) from about 25,000 Daltons to about 1,000,000 Daltons, e.g., from about 40,000 Daltons to about 500,000 Daltons or from about 50,000 Daltons to about 200,000 Daltons.

The linear triblock copolymers of the present disclosure can be formed as living polymers via anionic polymerization, in solution, in the presence of an anionic initiator, as described, for example, in U.S. Pat. Nos. RE27,145 and 4,116,917. Exemplary initiators may include or be a (mono) lithium hydrocarbon. Suitable lithium hydrocarbons may include unsaturated compounds such as allyl lithium, methallyl lithium; aromatic compounds such as phenyllithium, the tolyllithiums, the xylyllithiums and the naphthyllithiums, and in particular, the alkyl lithiums such as methyllithium, ethyllithium, propyllithium, butyllithium, amyllithium, hexyllithium, 2-ethylhexyllithium, and n-hexadecyllithium. In particular, the initiator may comprise or be secondary-butyllithium. The initiator(s) may be added to the polymerization mixture in two or more stages, optionally together with additional monomer.

The linear triblock copolymers of the present disclosure can, and may preferably, be prepared by step-wise polymerization of the monomers, e.g., polymerizing one of the two diene blocks, followed by the addition of the other monomer(s) (specifically including or being monoalkenyl arene monomer), followed by the polymerization of the second of the two diene blocks to form a living polymer having the formula polydiene block-poly(alkenyl arene) block-polydiene block.

If either or both of D' and D" are desired to be random diene copolymers, such as polyisoprene/polybutadiene copolymers, the living polydiene copolymer blocks, in the absence of the proper control of the polymerization will, as described in U.S. Pat. No. 7,163,913, not be a random copolymer and will instead comprise a polybutadiene block, a tapered segment containing both butadiene and isoprene addition product, and a polyisoprene block. To prepare a random copolymer, the more reactive butadiene monomer may be added gradually to the polymerization reaction mixture containing the less reactive isoprene such that the molar ratio of the monomers in the polymerization mixture is maintained at the required level. It is also possible to achieve the required randomization by gradually adding a mixture of the monomers to be copolymerized to the polymerization mixture. Living random copolymers may also be prepared by carrying out the polymerization in the presence of a so-called randomizer. Randomizers may include or be polar compounds that do not substantially deactivate the polymerization process and that tend to randomize the manner in which the monomers are incorporated into to the polymer chain. Suitable randomizers may include, but are not necessarily limited to, tertiary amines, such as trimethylamine, triethylamine, dimethylamine, tri-n-propylamine, tri-n-butylamine, dimethylaniline, pyridine, quinoline, N-ethyl-piperidine, N-methylmorpholine; thioethers, such as dimethyl sulfide, diethyl sulfide, di-n-propyl sulfide, di-n-butyl sulfide, methyl ethyl sulfide; and in particular, ethers such as dimethyl ether, methyl ether, diethyl ether, di-n-propyl ether, di-n-butyl ether, di-octyl ether, di-benzyl ether, di-phenyl ether, anisole, 1,2-dimethyloxyethane, o-dimethyloxybenzene, and cyclic ethers, such as tetrehydrofuran.

Even with controlled monomer addition and/or the use of a randomizer, the initial and terminal portions of the polymer chains may have greater than a "random" amount of polymer derived from the more reactive and less reactive monomer, respectively. Therefore, for the purpose of this invention, the term "random copolymer" means a polymer chain, or a polymer block, the preponderance of which (e.g., greater than 80%, such as greater than 90% or greater than 95%) results from the random addition of comonomer materials.

The solvents in which the living polymers can be formed may include relatively inert liquid solvents, such as hydrocarbons, e.g., aliphatic hydrocarbons such as pentane, hexane, heptane, octane, 2-ethylhexane, nonane, decane, cyclohexane, methylcyclohexane, or the like, or combinations thereof, and/or aromatic hydrocarbons, e.g., benzene, toluene, ethylbenzene, the xylenes, diethylbenzenes, propylbenzenes, or the like, or combinations thereof. Cyclohexane is particularly exemplary. Mixtures of hydrocarbons, e.g., lubricating oils, may additionally or alternatively be used.

The temperature at which the living polymerization is conducted may be varied within a wide range, such as from about −50° C. to about 150° C., such as from about 20° C. to about 80° C. The reaction may suitably be carried out in a relatively inert atmosphere, such as under nitrogen, and may optionally be carried out under pressure, e.g., a pressure from about 0.5 bar to about 10 bars.

The concentration of the initiator used to prepare the living polymer may also vary within a wide range and may advantageously be driven by the desired molecular weight of the living polymer.

The resulting linear block copolymers can then be hydrogenated using any suitable means. A hydrogenation catalyst may be used, e.g., a copper or molybdenum compound. Catalysts containing noble metals, or noble metal-containing compounds, can additionally or alternatively be used. Exemplary hydrogenation catalysts contain a non-noble metal or a non-noble metal-containing compound of Group VIII of the Periodic Table of Elements, e.g., iron, cobalt, and/or particularly nickel. Specific but non-exclusive examples of hydrogenation catalysts may include Raney nickel and nickel on kieselguhr. Particularly suitable hydrogenation catalysts may be those obtained by causing metal hydrocarbyl compounds to react with organic compounds of any of the group VIII metals iron, cobalt, and/or nickel, the latter compounds containing at least one organic compound that is attached to the metal atom via an oxygen atom as described, for example, in GB Patent No. 1,030,306. Preference may be given, in certain situations, to hydrogenation catalysts obtained by causing an aluminum trialkyl (e.g., aluminum triethyl(Al(Et$_3$)) or aluminum triisobutyl) to react with a nickel salt of an organic acid (e.g., nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts, etc.) or with nickel enolates or phenolates (e.g., nickel acet(on)ylacetonate, the nickel salt of butylacetophenone, etc.). Suitable hydrogenation catalysts should be well known to those skilled in the art, and the foregoing list(s) is(are) not necessarily intended to be exhaustive.

The hydrogenation of the block copolymers of the present disclosure may be suitably conducted, e.g., in solution, such as in a solvent which is relatively or substantially inert during the hydrogenation reaction. Saturated hydrocarbons and/or mixtures of saturated hydrocarbons may be suitable solvents. Advantageously, the hydrogenation solvent may be the same as the solvent in which polymerization is conducted, or may be miscible with the solvent in which polymerization is conducted (e.g., containing one or more components that are the same as in the polymerization solvent). Typically, when a hydrogenation process is performed, at least 50 mol %, e.g., at least 70 mol %, at least 80 mol %, at least 90 mol %, at least 95 mol %, at least 99 mol %, at least 99.5 mol %, at least 99.9 mol %, or substantially all, of the original olefinic unsaturation may be hydrogenated in the process.

Additionally or alternatively, the linear block copolymers of the present disclosure can be selectively hydrogenated such that the olefin saturations are hydrogenated as above, while the aromatic unsaturations are hydrogenated to a lesser extent. In certain embodiments, less than 15% (e.g., less than 10% or less than 5%) of the aromatic unsaturations may be hydrogenated during the process. Selective hydrogenation techniques are also well known to those of ordinary skill in the art and are described, for example, in U.S. Pat. Nos. 3,595,942, RE 27,145, and 5,166,277.

The polymer may then be recovered, e.g., as a solid or in concentrated liquid form, from the solvent in which it is hydrogenated by any convenient means, such as by evaporating the solvent. Alternatively, an extractant such as an oil (e.g., lubricating oil) may be added to the solution, and the solvent stripped off from the mixture so formed to provide a concentrate. Suitable concentrates may contain from about 3 wt % to about 25 wt % (e.g., in particular from about 5 wt % to about 23 wt %, from about 6 wt % to about 20 wt %, from about 6.5 wt % to about 20 wt %, or from about 6.5 wt % to about 15 wt %) of the linear triblock copolymer.

The linear triblock copolymers of the present disclosure may advantageously be used in the formulation of lubricating oil compositions for passenger car and heavy-duty diesel engines, e.g., for crankcases, and in the formulation of manual and/or automatic transmission fluids. The lubricating oil compositions may advantageously comprise a concentrate of the linear triblock copolymers and a diluent oil component of lubricating viscosity, the amount of VM concentrate and/or the concentrated amount of linear triblock copolymer desirably being effective to modify the viscosity index of the lubricating oil composition, and optionally other additives as needed to provide the lubricating oil/transmission fluid composition with the required properties. Once diluted, e.g., from concentrated form for the relevant application, lubricating oil and transmission fluid compositions may contain the linear block copolymer of the present disclosure in an amount from about 0.1 wt % to about 2.5 wt %, e.g., from about 0.3 wt % to about 1.5 wt % or from about 0.4 wt % to about 1.3 wt %, stated as mass percent active ingredient (AI) in the fully formulated lubricating oil/transmission fluid composition. The linear triblock copolymers of the present disclosure may comprise the sole VI improver (or VM), or may be used in combination with other VI improvers, for example, in combination with an VI improver comprising polyisobutylene, copolymers of ethylene and propylene (OCP), polymethacrylates, methacrylate copolymers, copolymers of an unsaturated dicarboxylic acid and a vinyl compound, interpolymers of styrene and acrylic esters, and hydrogenated copolymers of styrene/isoprene, styrene/butadiene, and other hydrogenated isoprene/butadiene copolymers, as well as the partially hydrogenated homopolymers of butadiene and isoprene.

Linear triblock copolymers according to the present disclosure may advantageously exhibit a relatively similar thickening efficiency across an array of different types or Groups of diluent oil basestocks, such as by exhibiting a relatively low thickening efficiency (TE) span. As defined below, TE span measurements may typically involve thickening efficiency measurements of linear triblock copolymers in at least three (preferably at least four) types of reference oils, or involving at least one reference oil in at least three Groups of reference oils (e.g., at least a Group II oil, a Group III oil, and a Group IV oil). In particular, four different types of reference oils can be used, across three Groups—a "standard" Group III oil (e.g., a natural basestock); a "non-standard" Group III oil (e.g., a synthetic GTL basestock); a Group II oil; and a Group IV oil. In particular, the TE span of the linear triblock copolymers can advantageously be at most about 0.5 or at most about 0.4, optionally but preferably while the linear block copolymers according to the present disclosure further exhibit an average Group III thickening efficiency (i.e., if applicable, a simple numerical average of the thickening efficiencies in the "standard" and "non-standard" Group III basestocks) of at least 1.7 or at least 1.8. Additionally or alternatively, in particular, the viscosity index of a 1 wt % solution of linear triblock copolymer in Group II basestock (grams of linear block copolymer per 100 grams basestock) may be 165 or less, 150 or less, or 140 or less (e.g., at least 90).

Optionally but preferably, linear triblock copolymers according to the present disclosure may advantageously exhibit flowability, particularly in concentrate form. Beaker pour testing indicates the relative amount (weight) of a VM concentrate that flows out of a beaker in a proscribed time period. Tan δ testing indicates a relative viscoelastic response of a composition/concentrate, which, for flowable samples, can indicate flowability or lack thereof. Thus, in addition to having an appropriately low KV100, linear triblock copolymer concentrates may exhibit a ~80° C. beaker pour of at least 80% (e.g., at least 83%, at least 85%, at least 87%, at least 88%, at least 89%, at least 90%, at least 91%, at least 92%, at least 93%, at least 94%, or at least 95%; optionally up to 99% or up to 98%) and/or a tan δ (G"/G') of at least 1.0 (e.g., at least 1.3, at least 1.5, at least 1.7, at least 1.8, at least 1.9, at least 2.0, at least 2.2, at least 2.4, at least 2.6, at least 2.8, at least 3.0, at least 3.5, at least 4.0, at least 4.5, or at least 5.0; optionally up to 50, up to 30, or up to 20).

Diluent oil components of lubricating viscosity useful in the context of the lubricating oil compositions of the present disclosure may be selected from natural lubricating oils, synthetic lubricating oils, and mixtures thereof. The diluent oil component may range in viscosity from light distillate mineral oils to heavy lubricating oils such as gasoline engine oils, mineral lubricating oils, and heavy-duty diesel oils. Generally, the (kinematic) viscosity of the diluent oil component may range from about 2 cSt to about 40 cSt, in particular from about 4 cSt to about 20 cSt, as measured at ~100° C., i.e., prior to addition of the linear block copolymer thereto in order to form the lubricating oil composition according to the present disclosure.

Natural oil components may include animal oils, vegetable oils (e.g., castor oil, lard oil, etc.), liquid petroleum oils, and hydrorefned, solvent-treated or acid-treated mineral oils of the paraffinic, naphthenic and mixed paraffinic-naphthenic types, and combinations thereof. Oils of lubricating viscosity derived from coal or shale may additionally or alternatively serve as useful oil components according to the present disclosure.

Synthetic oil components may include hydrocarbon oils and halo-substituted hydrocarbon oils such as polymerized and copolymerized olefins (e.g., polybutylenes, polypropylenes, propylen-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivatives, analogs, homologs, copolymers, and combinations thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene and/or propylene oxide, the alkyl and/or aryl ethers of polyoxyalkylene polymers (e.g., methyl-polyisopropylene glycol ether having a (number average) molecular weight of about 1000 or diphenyl ether of poly-ethylene glycol having a (number average) molecular weight of about 1000 to about 1500), and/or mono- and poly-carboxylic esters thereof, for example, acetic acid esters, mixed $C_3$-$C_8$ fatty acid esters, and $C_{13}$ oxo acid diester of tetraethylene glycol.

Another suitable class of synthetic oil components comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkylmalonic acids, alkenyl malonic acids) with any of a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Additional or alternative esters that may be useful as synthetic oil components may include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy-, or polyaryloxy-silicone oils and silicate oils comprise another useful class of synthetic oil components; such oils may include tetraethyl silicate, tetraisopropyl silicate, tetra-(2-ethylhexyl)silicate, tetra-(4-methyl-2-ethylhexyl) silicate, tetra-(p-tert-butyl-phenyl) silicate, hexa-(4-methyl-2-ethylhexyl)disiloxane, poly(methyl)siloxanes, poly (methyl-phenyl)siloxanes, and combinations thereof. Other additional or alternative synthetic oil components may include liquid esters of phosphorous-containing acids (e.g., tricresyl phosphate, trioctyl phosphate, diethyl ester of decylphosphonic acid) and polymeric tetrahydrofurans.

VM concentrates according to the present disclosure may consist essentially of (or may consist of) a linear triblock copolymer according to the present disclosure, a diluent oil, and optionally a pour point depressant. However, when VM concentrates include more than those components, they may advantageously include one or more lubricant oil composition additives, such as (but not necessarily limited to) a dispersant (e.g., an ashless dispersant), a detergent, an anti-wear agent, an antioxidant, a corrosion inhibitor, a friction modifier, an antifoamant, a seal-swelling control agent, or a combination thereof. VM concentrates containing a combination of such additives may alternatively be called additive concentrates (or addpacks). The concentrates, prior to or after addition of any additives, or irrespective of any other additives, may employ from 5 mass % to 25 mass % (e.g., from 5 mass % to 18 mass % or from 10 mass % to 15 mass %) of the concentrate containing the linear triblock copolymer and from 75 mass % to 95 mass % (e.g., from 82 mass % to 95 mass % or from 85 mass % to 90 mass %) of the diluent oil.

Lubricant oil compositions containing the linear triblock copolymers according to the present disclosure, by themselves or as VM concentrates according to the present disclosure, may also contain similar additives or addpacks.

Pour point depressants, otherwise known as lube oil flow improvers (LOFI), lower the minimum temperature at which the fluid will flow or can be poured. Such additives are well known. Typical of those additives that may improve the low temperature fluidity of the fluid are $C_8$ to $C_{18}$ dialkyl fumarate/vinyl acetate copolymers, polymethacrylates, and combinations thereof.

Ashless dispersants typically facilitate suspension of oil insolubles resulting from oxidation of a lubricating oil composition during wear or combustion. They are particularly advantageous for preventing the precipitation of sludge and the formation of varnish, particularly in gasoline engines.

Metal-containing or ash-forming detergents may function both as detergents to reduce or remove deposits and as acid neutralizers/rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number or TBN (as can be measured by ASTM D2896) from 0 to 80. A large amount of a metal base may be incorporated by reacting excess metal compound (e.g., an oxide or hydroxide) with an acidic gas (e.g., carbon dioxide). The resulting overbased detergent may contain neutralized detergent as the outer layer of a metal base (e.g., carbonate) micelle. Such overbased detergents may have a TBN of 150 or greater, and typically from 250 to 450 or more.

Dihydrocarbyl dithiophosphate metal salts are frequently used as antiwear and antioxidant agents in lubricating oil compositions. The metal may be an alkali or alkaline earth metal, or aluminum, lead, tin, molybdenum, manganese, nickel or copper. The zinc salts am most commonly used in lubricating oils and may be prepared in accordance with known techniques, e.g., by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides, and carbonates am most generally employed. Commercial additives frequently contain an excess of zinc due to the use of an excess of the basic zinc compound in the neutralization reaction.

Oxidation inhibitors or antioxidants reduce the tendency of lubricating oil compositions to deteriorate in service. Oxidative deterioration can be evidenced by sludge in the lubricant, varnish-like deposits on the metal surfaces, and by viscosity growth. Such oxidation inhibitors may include, but are not necessarily limited to, hindered phenols, alkaline earth metal salts of alkylphenolthioesters such as having $C_5$ to $C_{12}$ alkyl side chains, calcium nonylphenol sulfide, oil soluble phenates and sulfurized phenates, phosphosulfurized or sulfurized hydrocarbons, phosphorous esters, metal thiocarbamates, oil soluble copper compounds as described in U.S. Pat. No. 4,867,890, molybdenum-containing compounds, aromatic amines, and the like, and combinations and/or reaction products thereof.

Known friction modifiers include oil-soluble organo-molybdenum compounds. Such organo-molybdenum friction modifiers may also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly exemplary are molybdenum dithiocarbamates, dialkyldithiophosphates, alkyl xanthates, alkylthioxanthates, and combinations thereof.

Other known friction modifying materials, which may additionally or alternatively be present in the lubricating oil compositions according to the present disclosure, may include glyceryl monoesters of higher fatty acids, for example, glyceryl mono-oleate; esters of long chain polycarboxylic acids with diols, for example, the butane diol ester of a dimerized unsaturated fatty acid; oxazoline compounds; alkoxylated alkyl-substituted mono-amines, diamines and alkyl ether amines, for example, ethoxylated tallow amine and ethoxylated tallow ether amine; and combinations thereof.

Foam control in lubricating oil compositions can be provided by an antifoamant of the polysiloxane type, for example, silicone oil and/or polydimethyl siloxane.

Some of the above-mentioned additives can provide a multiplicity of effects; thus, for example, a single additive may act as a dispersant-oxidation inhibitor. This approach is well known and need not be further elaborated herein.

It may also be necessary to include an additive which maintains the stability of the viscosity of the blend/composition. Thus, although polar group-containing additives may achieve a suitably low viscosity in the pre-blending stage, it has been observed that some compositions may "age," or increase in viscosity when stored for prolonged periods. Additives that are typically effective in controlling this viscosity increase/ageing phenomenon may include long chain hydrocarbons functionalized by reaction with mono-/di-carboxylic acids and/or anhydrides used in the preparation of the ashless dispersants, as hereinbefore disclosed.

Representative effective amounts of such additional additives, when used in (crankcase) lubricating oil compositions according to the present disclosure, are listed below:

| ADDITIVE | Mass % (broad) | Mass % (in particular) |
|---|---|---|
| Ashless Dispersant | 0.1-20 | 1-8 |
| Metal Detergents | 0.1-15 | 0.2-9 |
| Corrosion Inhibitor | 0-5 | 0-1.5 |
| Metal Dihydrocarbyl Dithiophosphate | 0.1-6 | 0.1-4 |
| Antioxidant | 0-5 | 0.01-2 |
| Pour Point Depressant | 0.01-5 | 0.01-1.5 |
| Antifoaming Agent | 0-5 | 0.001-0.15 |
| Supplemental Antiwear Agents | 0-1.0 | 0-0.5 |
| Friction Modifier | 0-5 | 0-1.5 |
| Basestock (copolymer + diluent oil) | Balance | Balance |

Additionally or alternatively, the present disclosure may include one or more of the following embodiments.

Embodiment 1

A viscosity modifier (VM) concentrate comprising: from about 60 parts to about 95 parts of a diluent oil; and from about 5 parts to about 40 parts of a linear triblock copolymer characterized by the formula: D'-PA-D"; wherein D' represents a block derived from diene, PA represents a block derived from monoalkenyl arene (e.g., styrene or styrenic monomer), D" represents a block derived from diene, and the linear triblock copolymer is present in an amount effective to modify a lubricating kinematic viscosity at approximately 100° C. (KV100) of the concentrate, wherein the concentrate comprises at least 50 wt % of the diluent oil and the effective amount of the linear triblock copolymer is such that the concentrate comprises at least 6.0 wt % of the linear triblock copolymer, and wherein a KV100 of the diluent oil is from about 2 cSt to about 40 cSt, the KV100 of the concentrate is about 3000 cSt or less or about 2000 cSt or less, and the concentrate has a ~80° C. beaker pour of at least 87% and/or a tan δ of at least 1.8.

Embodiment 2

A concentrate according to embodiment 1, wherein the concentrate comprises from 6.0 wt % to about 13 wt % of the linear triblock copolymer.

Embodiment 3

A concentrate according to any one of the previous embodiments, wherein the KV100 of the concentrate is about 1000 cSt or less.

Embodiment 4

A concentrate according to any one of the previous embodiments, wherein D' has a number average molecular weight from about 62,000 Daltons to about 150,000 Daltons, PA has a number average molecular weight from about 15,000 Daltons to about 50,000 Daltons, and D" has a number average molecular weight from about 5,000 to about 80,000 daltons.

Embodiment 5

A concentrate according to any one of the previous embodiments, wherein: (i) D' has a number average molecular weight from about 63,000 Daltons to about 95,000 Daltons; (ii) PA has a number average molecular weight from about 20,000 Daltons to about 36,000 Daltons; or (iii) both (i) and (ii).

Embodiment 6

A VM concentrate comprising: from about 60 parts to about 90 parts of a diluent oil; and from about 10 parts to about 40 parts of a linear triblock copolymer characterized by the formula: D'-PA-D"; wherein D' represents a block derived from diene, PA represents a block derived from monoalkenyl arene, D" represents a block derived from diene, and the linear triblock copolymer is present in an amount effective to modify a lubricating kinematic viscosity at approximately 100° C. (KV100) of the concentrate, wherein the concentrate comprises at least 50 wt % of the diluent oil and the effective amount of the linear triblock copolymer is such that the concentrate comprises at least 9.5 wt % (e.g., from 9.5 wt % to 14 wt %) of the linear triblock copolymer, and wherein a KV100 of the diluent oil is from about 2 cSt to about 40 cSt, the KV100 of the concentrate is about 3000 cSt or less or about 2000 cSt or less, and optionally the concentrate has a ~80° C. beaker pour of at least 85% and/or a tan δ of at least 1.5.

Embodiment 7

A concentrate according to embodiment 6, wherein the KV100 of the concentrate is from about 1000 cSt to about 2000 cSt.

Embodiment 8

A concentrate according to embodiment 6 or embodiment 7, wherein D' has a number average molecular weight from about 20,000 Daltons to about 60,000 Daltons, PA has a number average molecular weight from about 10,000 Daltons to about 40,000 Daltons, and D" has a number average molecular weight from about 5,000 to about 40,000 daltons.

Embodiment 9

A concentrate according to any one of embodiments 6-8, wherein one or more of the following is satisfied: (i) D' has a number average molecular weight from about 25,000 Daltons to about 50,000 Daltons; (ii) PA has a number average molecular weight from about 15,000 Daltons to about 35,000 Daltons; and (iii) D" has a number average molecular weight from about 7,000 to about 20,000.

Embodiment 10

A concentrate according to any one of embodiments 6-9, wherein a ratio between the number average molecular weight of D' and the number average molecular weight of D" is from about 1.4:1 to about 3.0:1 or from about 6.00:1 to about 20.0:1.

Embodiment 11

A VM concentrate comprising: from about 60 parts to about 95 parts of a diluent oil; and from about 5 parts to about 40 parts of a linear triblock copolymer characterized by the formula: D'-PA-D"; wherein D' represents a block derived from diene, PA represents a block derived from monoalkenyl arene, D" represents a block derived from diene, and the linear triblock copolymer exhibits a thickening efficiency span of at most 0.5 and is present in an amount effective to modify a lubricating kinematic viscosity at approximately 100° C. (KV100) of the concentrate, wherein the concentrate comprises at least 50 wt % of the diluent oil, and wherein the KV100 of the diluent oil is from about 2 cSt to about 40 cSt and the KV100 of the concentrate is about 3000 cSt or less or about 2000 cSt or less.

Embodiment 12

A concentrate according to embodiment 11, wherein the effective amount of the linear triblock copolymer is such that the concentrate comprises from 6.0 wt % to 14 wt % of the linear triblock copolymer.

Embodiment 13

A concentrate according to embodiment 11 or embodiment 12, wherein D' has a number average molecular weight from about 30,000 Daltons to about 95,000 Daltons, PA has a number average molecular weight from about 20,000 Daltons to about 35,000 Daltons, D" has a number average molecular weight from about 1,800 to about 60,000 daltons, and a ratio between the number average molecular weight of D' and the number average molecular weight of D" is from about 1.0:1 to about 30:1.

Embodiment 14

A concentrate according to any one of the previous embodiments, wherein the KV00 of the lubricating oil composition is from about 100 cSt to about 1600 cSt.

Embodiment 15

A concentrate according to any one of the previous embodiments, wherein the D' and D" dienes each individually comprise butadiene, isoprene, and mixtures thereof, but are not identical to each other, and wherein the D' and D" blocks are substantially hydrogenated after polymerization.

Embodiment 16

A concentrate according to any one of the previous embodiments, wherein the D' and D" dienes each individually comprise: (i) not more than about 3 wt % butadiene; (ii) at least about 97 wt % isoprene; (iii) both (i) and (ii).

Embodiment 17

A concentrate according to any one of the previous embodiments, wherein a ratio of PA number average molecular weight to a sum of D'+D" number average molecular weight is from about 0.25 to about 0.50.

Embodiment 18

A concentrate according to any one of the previous embodiments, wherein a ratio between the number average molecular weight of D' and the number average molecular weight of D" is above 1.00:1 up to about 1.25:1 or from about 1.4:1 to about 3.0:1 or from about 6.00:1 to about 20.0:1.

Embodiment 19

A concentrate according to any one of the previous embodiments, wherein the diluent oil comprises a Group II, Group III, and/or Group IV basestock, e.g., a Group II and/or Group III basestock.

Embodiment 20

A concentrate according to any one of the previous embodiments, further comprising one or more of an ashless dispersant, a detergent, an anti-wear agent, an antioxidant, a corrosion inhibitor, a friction modifier, an antifoamant, a seal-swelling control agent, or a combination thereof.

Embodiment 21

A method of modifying the kinematic viscosity at approximately 100° C. (KV100) of the VM concentrate of any one of embodiments 1-5 and 14-20, the method comprising adding to the concentrate an effective amount of the linear triblock copolymer characterized by the formula: D'-PA-D"; wherein D' represents the block derived from diene, PA represents the block derived from monoalkenyl arene, D" represents the block derived from diene, and the effective amount of the linear triblock copolymer comprises at least 6.0 wt % of the concentrate while the KV100 of the concentrate is about 3000 cSt or less or about 2000 cSt or less.

Embodiment 22

A method of modifying the kinematic viscosity at approximately 100° C. (KV100) of the concentrate of any one of embodiments 6-10 and 14-20, the method comprising adding to the concentrate an effective amount of the linear triblock copolymer characterized by the formula: D'-PA-D"; wherein D' represents the block derived from diene, PA represents the block derived from monoalkenyl arene, D" represents the block derived from diene, and the effective amount of the linear triblock copolymer comprises at least 9.5 wt % of the concentrate while the KV100 of the concentrate is about 3000 cSt or less or about 2000 cSt or less.

Embodiment 23

A method of modifying the kinematic viscosity at approximately 100° C. (KV100) of the VM concentrate of any one of embodiments 11-20, the method comprising adding to the concentrate an effective amount of the linear triblock copolymer characterized by the formula: D'-PA-D"; wherein: D' represents the block derived from diene; PA represents the block derived from monoalkenyl arene; D" represents the block derived from diene; the linear triblock copolymer exhibits a thickening efficiency span of at most 0.5; and the KV100 of the concentrate containing the effective amount of the linear triblock copolymer is about 3000 cSt or less or about 2000 cSt or less.

Embodiment 24

Use of a VM concentrate having a modified KV100 according to any one of embodiments 1-20 to control or reduce the wear in an automatic or manual transmission lubricated by a lubricant oil composition comprising the VM concentrate.

EXAMPLES

This invention may be further understood by reference to the following (non-limiting) examples. In the following Examples, the properties of certain components or the composition itself are described using certain terms of art, as defined below. In the Examples, all parts are parts by weight, unless otherwise noted.

"Shear Stability Index (SSI)" measures the ability of polymer components in crankcase lubricants to maintain thickening power during shear conditions and is typically indicative of the resistance of a polymer to degradation under service conditions. The higher the SSI, the less stable the polymer, i.e., the more susceptible it is to degradation. SSI is defined as the percentage of polymer-derived viscosity loss and is calculated as follows:

$$SSI = 100 \times \frac{kv_{fresh} - kv_{after}}{kv_{fresh} - kv_{oil}}$$

wherein $kv_{fresh}$ is the kinematic viscosity of the polymer-containing solution before degradation, and $kv_{after}$ is the kinematic viscosity of the polymer-containing solution after degradation. SSI is conventionally determined using ASTM D6278-98 (known as the Kurt-Orban (KO) or DIN bench test). The polymer under test may be dissolved in suitable base oil (for example, solvent extracted 150 neutral) to a relative viscosity of about 2-3 cSt at ~100° C., and the resulting fluid may be pumped through the testing apparatus specified in the ASTM D6278.98 protocol.

"Thickening Efficiency (TE)" is representative of a polymer's ability to thicken oil per unit mass and is defined as:

$$TE = \frac{2}{c\ln 2}\ln\left(\frac{kv_{oil+polymer}}{kv_{oil}}\right)$$

wherein c is polymer concentration (grams of polymer/100 grams solution), $kv_{oil+polymer}$ is kinematic viscosity of the polymer in the reference oil, and $kv_{oil}$ is kinematic viscosity of the reference oil. In most cases, as in the Examples hereinbelow, TE is measured at approximately 1 wt % concentration in a reference oil.

"Thickening efficiency span (TE span)" is representative of the relative uniformity of a polymer's thickening efficiency (TE) across an array of different types or Groups of reference oils, i.e., involving at least three (preferably at least four) types of reference oils, or involving at least one reference oil in at least three Groups of reference oils (e.g., at least a Group II oil, a Group III oil, and a Group IV oil). In particular, four different types of reference oils can be used, across three Groups—a "standard" Group III oil (e.g., a natural basestock); a "non-standard" Group III oil (e.g., a synthetic GTL basestock); a Group II oil; and a Group IV oil. In the present disclosure, TE span is evaluated at approximately the same concentration in each different reference oil, e.g., ~1 wt % polymer concentration. The TE span is represented by the absolute value of the largest binary thickening efficiency difference (ΔTE) between a polymer in any two different reference oils in the array.

"Cold Cranking Simulator (CCS)" is a measure of the cold-cranking characteristics of crankcase lubricants and is conventionally determined using a technique described in ASTM D5293-92.

"Scanning Brookfield" is used to measure the apparent viscosity of engine oils at low temperatures. A shear rate of approximately 0.2 s$^{-1}$ is produced at shear stresses below ~100 Pa. Apparent viscosity is measured continuously as the sample is cooled at a rate of about 1° C./hr over the range of about –5° C. to about 40° C., or to the temperature at which the viscosity exceeds 40,000 mPa·s (cPs). The test procedure is defined in ASTM D5133-01. The measurements resulting from the test method are reported as viscosity in mPa·s or the equivalent cPs, the maximum rate of viscosity increase (Gelation Index) and the temperature at which the Gelation Index occurs.

"Mini Rotary Viscometer (MRV)-TP-1" measures yield stress and viscosity of engine oils after cooling at controlled rates over a period of ~45 hours to a final test temperature between about –15° C. and about –40° C. The temperature cycle is defined in SAE Paper No. 850443, by K. O. Henderson et al. Yield stress (YS) is measured first at the test temperature and apparent viscosity is then measured at a shear stress of ~525 Pa over a shear rate of about 0.4 s$^{-1}$ to about 15 s$^{-1}$. Apparent viscosity is reported in mPa·s, or the equivalent cPs.

"Pour point" measures the ability of an oil composition or component to flow as the temperature is lowered. Performance is reported in ° C. and is measured using the test procedure described in ASTM D97-02. After preliminary heating, the sample is cooled at a specified rate and examined at intervals of ~3° C. for flow characteristics. The lowest temperature at which movement of the specimen is observed is reported as the pour point. Each of MRV-TP-1, CCS, and pour point is typically indicative of the low temperature viscometric properties of oil compositions.

A "Beaker Pour" test measures the bulk flow of a composition at a given temperature out of a ~600-mL beaker oriented at an angle of ~96°, relative to a horizontal table surface. Beaker Pour testing can be done for samples held at a given temperature for only ~24 hours (week 0), or for extended periods of time, such as up to 12 weeks or longer. Beaker Pour values are a fraction, expressed as a percentage, of sample that flows out of the beaker in ~2 minutes (=[sample plus beaker weight prior to test]–[sample plus beaker weight immediately after test]). Herein, Beaker Pour tests are reported for week 0 samples held at ~80° C. (±1° C.), with any portion of a sample present on the exterior walls of the beaker in its upright position after the test (sitting flat on the horizontal table surface) being wiped off with a dry tissue, for safety.

Another measure of flowability of a composition involves tan δ, which is a ratio of the loss modulus (G") of a composition to the storage modulus (G'). Although tan δ can theoretically encapsulate a ratio of tensile moduli (E"/E'), herein it is understood as a ratio of shear moduli (G"/G'), which is more indicative of the flowable, viscous state in which the triblock copolymeric samples exist. Tan δ values expressed herein were measured with an ARES™ G2 rheometer using ~25 mm parallel plates with a gap of either ~0.5 mm or ~1 mm, including its native software package (TRIOS™), commercially available from TA Instruments of New Castle, Del. Samples were cycled twice from ~25° C. to ~200° C. and back at a ~5.0° C./min ramp rate, and tan δ data reflected measurements taken at a temperature of ~25° C. at the beginning of the first ramp up (values at the beginning of the second ramp up were checked to be within measurement error) at an angular frequency of ~10 rad/s and a maximum oscillation strain of ~10%.

"Crystallinity" in ethylene-alpha-olefin copolymers can be measured using X-ray techniques known in the art as well as by the use of a differential scanning calorimetry (DSC) test. DSC can be used to measure crystallinity as follows: a polymer sample is annealed at room temperature (e.g., ~20-25° C.) for at least 24 hours before the measurement. Thereafter, the sample is first cooled to about –100° C. from room temperature, and then heated to about 150° C. at 10° C./min. Crystallinity is calculated as follows:

% Crystallinity=(ΣΔH)*$x_{m\ ethylene}$*14÷4110*100% wherein ΣΔH (J/g) is the sum of the heat absorbed by the polymer above its glass transition temperature, $x_{m\ ethylene}$ is the molar fraction of ethylene in the polymer calculated, e.g., from proton NMR data, 14 (g/mol) is the approximate molar mass of a methylene unit, and 4110 (J/mol) is the approximate heat of fusion for a single crystal of polyethylene at equilibrium.

"Coil collapse temperature (CCT)" can be measured by plotting relative viscosity vs. temperature, wherein "relative viscosity" is the ratio of the kinematic viscosity of a ~1 mass % polymer in solvent at ~100° C. to the kinematic viscosity of the solvent at ~100° C. (KV100). The CCT is the temperature at which the relative viscosity is highest.

"Viscosity Index" can measure the susceptibility of a lubricant composition (or basestock) to changes in temperature. Viscosity index can be calculated using the following formula:

$$VI = 100\frac{L-U}{L-H}$$

where U is the composition's kinematic viscosity at ~40° C. (~104° F.; KV40), and L and H are values based on the composition's kinematic viscosity at ~100° C. (~212° F.; KV100). L and H are the KV40 values for oils of VI ~0 and ~100 respectively, having the same KV100 as the oil whose VI is to be determined. L and H values can be found, for example, in ASTM D2270.

Examples 1-6

Examples 1-4 describe linear triblock copolymers of the type D'-PA-D", according to the present disclosure. In these Examples, the higher molecular weight diene block is D', and the lower molecular weight diene block is D". The polyarene block in these Examples is a polystyrene block. Examples 1A, 2A, 3, and 4 include the linear triblock copolymers in concentrate form with "active ingredient" (AI) concentrations of about 6 mass %, about 7.5 mass %, about 12 mass %, and about 6 mass %, respectively, as substantially dissolved or suspended in a "standard" Group III diluent oil having a KV100 of about 4 cSt (Yubase 4). Examples 1B and 2B include the same linear triblock copolymers in concentrate form with AI concentrations of about 6 mass % each as substantially dissolved or suspended in a "non-standard" Group III diluent oil (synthetically made using a gas-to-liquids process) having a KV100 of about 4 cSt (GTL 4). The KV100 of each concentrate sample, as well as the molecular weights of the block copolymer segments of the linear triblock copolymers, the basestock diluent, and the active ingredient concentration, is delineated in Table 1 below. Also shown in Table 1 below are Comparative Examples 5 and 6, which show linear diblock copolymers of the type D'-PA, in which the diene block, D', has a molecular weight of about 65 kiloDaltons and about 55 kiloDaltons, respectively, and in which the polyarene (polystyrene) block, PA, has a molecular weight of about 35 kiloDaltons and about 23 kiloDaltons, respectively. The basestock diluent is the "standard" Group III basestock (Yubase 4) for Comparative Example 5 and the "non-standard" Group III basestock (GTL 4) for Comparative Example 6. As can be seen in Table 1, below, at active ingredient concentrations even as low as about 5 mass %, each diblock copolymer gelled in its diluent oil, instead of having a measurable KV100.

TABLE 1

| Sample | D' [kDa] | PA [kDa] | D" [kDa] | Diluent | AI [wt %] | KV100 [cSt] |
|---|---|---|---|---|---|---|
| 1A | 70 | 35 | 67 | Yubase 4 | 6 | 1340 |
| 1B | 70 | 35 | 67 | GTL 4 | 6 | 1200 |
| 2A | 64 | 33 | 8.6 | Yubase 4 | 7.5 | 1230 |
| 2B | 64 | 33 | 8.6 | GTL 4 | 6 | 603 |
| 3 | 36 | 21 | 15 | Yubase4 | 12 | 1240 |
| 4 | 91 | 32 | 8.2 | Yubase4 | 6 | 1590 |
| 5 (comp) | 65 | 35 | — | Yubase 4 | 5 | Gel |
| 6 (comp) | 55 | 23 | — | GTL 4 | 5 | Gel |

Examples 7-28

Examples 7-26 describe linear triblock copolymers of the type D'-PA-D", according to the present disclosure. In these Examples, the higher molecular weight diene block is D', and the lower molecular weight diene block is D". The polyarene block in these Examples is a polystyrene block. In these Examples, the "active ingredient" (AI) concentrations of the linear triblock copolymers in concentrate form can vary from about 6 mass % to about 8 mass % to about 10 mass % to about 12 mass % to about 14 mass %, as substantially dissolved or suspended in one or more of the following diluent oils: a Group II basestock having a KV100 of about 4 cSt (Star 4); a "standard" Group III basestock having a KV100 of about 4 cSt (Yubese 4); a "non-standard" Group III basestock (synthetically made using a gas-to-liquids process) having a KV100 of about 4 cSt (GTL 4); and a Group IV (polyalphaolefin) basestock having a KV100 of about 4 cSt (PAO 4). The KV100 of each concentrate sample, as well as the molecular weights of the block copolymer segments of the linear triblock copolymers, the basestock diluent, and the active ingredient concentration, is delineated in Table 2 below. Where a linear triblock copolymer exhibited gelation during the process of dissolving or suspending it in its diluent oil, the KV100 in Table 2 indicates "Gel." Also shown in Table 2 below are Comparative Examples 27 and 28, which show concentrate forms of linear diblock copolymers of the type D'-PA, in which the diene block, D', has a molecular weight of about 57 kiloDaltons and about 72 kiloDaltons, respectively, and in which the polyarene (polystyrene) block, PA, has a molecular weight of about 21 kiloDaltons and about 28 kiloDaltons, respectively. As can be seen in Table 2, below, at active ingredient concentrations even as low as about 6 mass %, each diblock copolymer gelled in its diluent oil, instead of having a measurable KV100.

Generally, though not for all applications, lower KV100 values at relatively higher AI concentrations is seen as desirable. Additionally or alternatively, the ability of a linear triblock copolymer concentrate sample (Example) to have a KV100 of about 3000 cSt or less or about 2000 cSt or less (and optionally also of at least 100 cSt), at as high an AI concentration as possible, is seen as desirable. Further additionally or alternatively, a linear triblock copolymer concentrate exhibiting a Beaker Pour (week 0) value of at least 87% (or of at least 90%, and optionally also up to 99%), can be seen as desirable. Still further additionally or alternatively, a linear triblock copolymer concentrate exhibiting a tan δ value (measured at ~25° C.) of at least 1.8 (and optionally also of up to 30) can be seen as desirable.

TABLE 2

| Sample | D' [kDa] | PA [kDa] | D" [kDa] | Diluent | AI [wt %] | KV100 [cSt] | Beaker Pour | Tan δ [@25° C.] |
|---|---|---|---|---|---|---|---|---|
| 7A | 64 | 33 | 8.6 | Yubase 4 | 6 | 599 | 96% | 5.1 |
| 7B | 64 | 33 | 8.6 | GTL 4 | 6 | 722 | 93% | 3.8 |
| 7C | 64 | 33 | 8.6 | PAO 4 | 6 | Gel | 87% | 0.2 |
| 7D | 64 | 33 | 8.6 | Star 4 | 6 | 650 | 95% | 4.8 |
| 8A | 61 | 28 | 8.9 | Yubase 4 | 6 | 650 | 97% | 4.3 |
| 8B | 61 | 28 | 8.9 | GTL 4 | 6 | 663 | 96% | 4.9 |
| 8C | 61 | 28 | 8.9 | PAO 4 | 6 | 507 | 97% | 4.5 |
| 8D | 61 | 28 | 8.9 | Star 4 | 6 | 709 | 95% | 4.3 |
| 8E | 61 | 28 | 8.9 | Yubase 4 | 8 | 1960 | — | — |
| 8F | 61 | 28 | 8.9 | GTL 4 | 8 | 1330 | — | — |
| 8G | 61 | 28 | 8.9 | PAO 4 | 8 | 1330 | — | — |
| 8H | 61 | 28 | 8.9 | Star 4 | 8 | 1880 | — | — |
| 9A | 59 | 30 | 57 | Yubase 4 | 6 | 1410 | 95% | 2.8 |
| 9B | 59 | 30 | 57 | GTL 4 | 6 | 1230 | 95% | 2.7 |
| 9C | 59 | 30 | 57 | PAO 4 | 6 | 1070 | 96% | 3.1 |
| 9D | 59 | 30 | 57 | Star 4 | 6 | 1440 | 88% | 2.2 |
| 10A | 36 | 21 | 15 | Yubase 4 | 10 | 509 | — | — |
| 10B | 36 | 21 | 15 | GTL 4 | 10 | 528 | — | — |
| 10C | 36 | 21 | 15 | Yubase 4 | 12 | 1140 | — | — |
| 10D | 36 | 21 | 15 | GTL 4 | 12 | 1140 | — | — |
| 11A | 56 | 21 | 1.9 | Yubase 4 | 6 | 420 | 96% | 4.6 |
| 11B | 56 | 21 | 1.9 | GTL 4 | 6 | 504 | 96% | 5.5 |
| 11C | 56 | 21 | 1.9 | PAO 4 | 6 | 474 | 96% | 5.4 |
| 11D | 56 | 21 | 1.9 | Star 4 | 6 | 253 | 96% | 4.1 |
| 11E | 56 | 21 | 1.9 | Yubase 4 | 8 | 1450 | — | — |
| 11F | 56 | 21 | 1.9 | GTL 4 | 8 | 1770 | — | — |
| 11G | 56 | 21 | 1.9 | PAO 4 | 8 | 1640 | — | — |
| 11H | 56 | 21 | 1.9 | Star 4 | 8 | 768 | — | — |
| 11J | 56 | 21 | 1.9 | Yubase 4 | 10 | 4510 | — | — |

TABLE 2-continued

| Sample | D' [kDa] | PA [kDa] | D" [kDa] | Diluent | AI [wt %] | KV100 [cSt] | Beaker Pour | Tan δ [@25° C.] |
|---|---|---|---|---|---|---|---|---|
| 11K | 56 | 21 | 1.9 | PAO 4 | 10 | 4060 | — | — |
| 11L | 56 | 21 | 1.9 | Star 4 | 10 | 2160 | — | — |
| 12A | 66 | 25 | 5.2 | Yubase 4 | 6 | 678 | 95% | 4.9 |
| 12B | 66 | 25 | 5.2 | GTL 4 | 6 | 593 | 95% | 6.4 |
| 12C | 66 | 25 | 5.2 | PAO 4 | 6 | 573 | 95% | 6.1 |
| 12D | 66 | 25 | 5.2 | Star 4 | 6 | 447 | 95% | 4.5 |
| 12E | 66 | 25 | 5.2 | Yubase 4 | 8 | 2590 | — | — |
| 12F | 66 | 25 | 5.2 | GTL 4 | 8 | 2220 | — | — |
| 12G | 66 | 25 | 5.2 | PAO 4 | 8 | 1730 | — | — |
| 12H | 66 | 25 | 5.2 | Star 4 | 8 | 1370 | — | — |
| 12J | 66 | 25 | 5.2 | Yubase 4 | 10 | 5890 | — | — |
| 12K | 66 | 25 | 5.2 | PAO 4 | 10 | 6020 | — | — |
| 12L | 66 | 25 | 5.2 | Star 4 | 10 | 4120 | — | — |
| 13A | 57 | 22 | 7.5 | Yubase 4 | 6 | 329 | 96% | 10.4 |
| 13B | 57 | 22 | 7.5 | GTL 4 | 6 | 336 | 97% | 11.0 |
| 13C | 57 | 22 | 7.5 | PAO 4 | 6 | 322 | 97% | 12.1 |
| 13D | 57 | 22 | 7.5 | Star 4 | 6 | 227 | 97% | 8.2 |
| 13E | 57 | 22 | 7.5 | Yubase 4 | 8 | 1020 | — | — |
| 13F | 57 | 22 | 7.5 | GTL 4 | 8 | 981 | — | — |
| 13G | 57 | 22 | 7.5 | PAO 4 | 8 | 927 | — | — |
| 13H | 57 | 22 | 7.5 | Star 4 | 10 | 640 | — | — |
| 13J | 57 | 22 | 7.5 | Yubase 4 | 10 | 2180 | — | — |
| 13K | 57 | 22 | 7.5 | GTL 4 | 10 | 2930 | — | — |
| 13L | 57 | 22 | 7.5 | PAO 4 | 10 | 2840 | — | — |
| 13M | 57 | 22 | 7.5 | Star 4 | 10 | 1590 | — | — |
| 14A | 78 | 26 | 8.9 | Yubase 4 | 6 | 676 | 95% | 4.0 |
| 14B | 78 | 26 | 8.9 | GTL 4 | 6 | 685 | 95% | 4.7 |
| 14C | 78 | 26 | 8.9 | PAO 4 | 6 | 656 | 95% | 4.6 |
| 14D | 78 | 26 | 8.9 | Star 4 | 6 | 447 | 95% | 3.6 |
| 14E | 78 | 26 | 8.9 | Yubase 4 | 8 | 2110 | 90% | 2.2 |
| 14F | 78 | 26 | 8.9 | GTL 4 | 8 | 1950 | 91% | 2.3 |
| 14G | 78 | 26 | 8.9 | PAO 4 | 8 | 1930 | 89% | 2.3 |
| 14H | 78 | 26 | 8.9 | Star 4 | 8 | 1380 | 88% | 2.1 |
| 14J | 78 | 26 | 8.9 | Yubase 4 | 10 | 5010 | — | — |
| 14K | 78 | 26 | 8.9 | GTL 4 | 10 | 5250 | — | — |
| 14L | 78 | 26 | 8.9 | PAO 4 | 10 | 6130 | — | — |
| 14M | 78 | 26 | 8.9 | Star 4 | 10 | 4080 | — | — |
| 15A | 75 | 23 | 6.3 | Yubase 4 | 6 | 708 | 94% | 3.5 |
| 15B | 75 | 23 | 6.3 | GTL 4 | 6 | 747 | 94% | 4.0 |
| 15C | 75 | 23 | 6.3 | PAO 4 | 6 | 727 | 94% | 4.0 |
| 15D | 75 | 23 | 6.3 | Star 4 | 6 | 508 | 94% | 3.2 |
| 15E | 75 | 23 | 6.3 | Yubase 4 | 8 | 2440 | 90% | 2.0 |
| 15F | 75 | 23 | 6.3 | GTL 4 | 8 | 2300 | 90% | 2.1 |
| 15G | 75 | 23 | 6.3 | PAO 4 | 8 | 2240 | 91% | 2.1 |
| 15H | 75 | 23 | 6.3 | Star 4 | 8 | 1570 | 89% | 1.9 |
| 15J | 75 | 23 | 6.3 | Yubase 4 | 10 | 6290 | 81% | 1.5 |
| 15K | 75 | 23 | 6.3 | GTL 4 | 10 | 5730 | 85% | 1.5 |
| 15L | 75 | 23 | 6.3 | PAO 4 | 10 | 5760 | 86% | 1.5 |
| 15M | 75 | 23 | 6.3 | Star 4 | 10 | 4200 | 85% | 1.5 |
| 16A | 59 | 27 | 8.0 | Yubase 4 | 6 | 438 | 96% | 6.5 |
| 16B | 59 | 27 | 8.0 | GTL 4 | 6 | 390 | 96% | 8.1 |
| 16C | 59 | 27 | 8.0 | PAO 4 | 6 | 382 | 96% | 7.9 |
| 16D | 59 | 27 | 8.0 | Star 4 | 6 | 382 | 96% | 6.5 |
| 16E | 59 | 27 | 8.0 | Yubase 4 | 8 | 1220 | 93% | 3.6 |
| 16F | 59 | 27 | 8.0 | GTL 4 | 8 | 1110 | 94% | 3.9 |
| 16G | 59 | 27 | 8.0 | PAO 4 | 8 | 1130 | 96% | 3.9 |
| 16H | 59 | 27 | 8.0 | Star 4 | 8 | 1150 | 92% | 3.2 |
| 16J | 59 | 27 | 8.0 | Yubase 4 | 10 | 2730 | 88% | 2.1 |
| 16K | 59 | 27 | 8.0 | GTL 4 | 10 | 2650 | 91% | 2.2 |
| 16L | 59 | 27 | 8.0 | PAO 4 | 10 | 2730 | 91% | 2.1 |
| 16M | 59 | 27 | 8.0 | Star 4 | 10 | 2690 | 87% | 2.0 |
| 16N | 59 | 27 | 8.0 | Yubase 4 | 12 | 5740 | 85% | 1.6 |
| 16P | 59 | 27 | 8.0 | Star 4 | 12 | 5500 | 85% | 1.5 |
| 17A | 41 | 22 | 5.4 | Yubase 4 | 6 | 156 | 97% | — |
| 17B | 41 | 22 | 5.4 | GTL 4 | 6 | 151 | 98% | — |
| 17C | 41 | 22 | 5.4 | PAO 4 | 6 | 142 | 98% | — |
| 17D | 41 | 22 | 5.4 | Star 4 | 6 | 118 | 99% | — |
| 17E | 41 | 22 | 5.4 | Yubase 4 | 8 | 459 | 95% | 6.6 |
| 17F | 41 | 22 | 5.4 | GTL 4 | 8 | 450 | 96% | 15.1 |
| 17G | 41 | 22 | 5.4 | PAO 4 | 8 | 431 | 93% | 8.9 |
| 17H | 41 | 22 | 5.4 | Star 4 | 8 | 306 | 96% | 7.7 |
| 17J | 41 | 22 | 5.4 | Yubase 4 | 10 | 1120 | 93% | 4.5 |
| 17K | 41 | 22 | 5.4 | GTL 4 | 10 | 1020 | 94% | 5.5 |
| 17L | 41 | 22 | 5.4 | PAO 4 | 10 | 989 | 93% | 5.2 |
| 17M | 41 | 22 | 5.4 | Star 4 | 10 | 719 | 93% | 4.2 |
| 17N | 41 | 22 | 5.4 | Yubase 4 | 12 | 2180 | — | 3.1 |
| 17P | 41 | 22 | 5.4 | GTL 4 | 12 | 2190 | 90% | 3.2 |

TABLE 2-continued

| Sample | D' [kDa] | PA [kDa] | D" [kDa] | Diluent | AI [wt %] | KV100 [cSt] | Beaker Pour | Tan δ [@25° C.] |
|---|---|---|---|---|---|---|---|---|
| 17Q | 41 | 22 | 5.4 | PAO 4 | 12 | 2200 | 90% | 3.3 |
| 17R | 41 | 22 | 5.4 | Star 4 | 12 | 1550 | 90% | 2.8 |
| 17S | 41 | 22 | 5.4 | Yubase 4 | 14 | 4330 | — | 2.1 |
| 17T | 41 | 22 | 5.4 | GTL 4 | 14 | 4480 | 87% | 2.0 |
| 17U | 41 | 22 | 5.4 | PAO 4 | 14 | 4410 | 87% | 2.1 |
| 17V | 41 | 22 | 5.4 | Star 4 | 14 | 3340 | 86% | 1.9 |
| 18A | 91 | 32 | 8.2 | Yubase 4 | 6 | 1670 | 95% | 1.9 |
| 18B | 91 | 32 | 8.2 | GTL 4 | 6 | 2670 | 93% | 1.3 |
| 18C | 91 | 32 | 8.2 | PAO 4 | 6 | 2940 | 91% | 1.2 |
| 18D | 91 | 32 | 8.2 | Star 4 | 6 | 1760 | 91% | 1.9 |
| 18E | 91 | 32 | 8.2 | Yubase 4 | 8 | 7390 | — | — |
| 18F | 91 | 32 | 8.2 | GTL 4 | 8 | 6000 | — | — |
| 18G | 91 | 32 | 8.2 | PAO 4 | 8 | Gel | — | — |
| 18H | 91 | 32 | 8.2 | Star 4 | 8 | 6370 | — | — |
| 19A | 67 | 33 | 4.9 | Yubase 4 | 6 | 761 | 96% | 3.7 |
| 19B | 67 | 33 | 4.9 | GTL 4 | 6 | Gel | 84% | 1.2 |
| 19C | 67 | 33 | 4.9 | PAO 4 | 6 | 727 | 93% | 3.8 |
| 19D | 67 | 33 | 4.9 | Star 4 | 6 | 854 | 95% | 3.2 |
| 20A | 67 | 40 | 8.9 | Yubase 4 | 6 | 773 | 96% | 3.2 |
| 20B | 67 | 40 | 8.9 | GTL 4 | 6 | Gel | 83% | 0.2 |
| 20C | 67 | 40 | 8.9 | PAO 4 | 6 | Gel | 79% | 0.3 |
| 20D | 67 | 40 | 8.9 | Star 4 | 6 | 693 | 95% | 3.9 |
| 21A | 59 | 40 | 7.5 | Yubase 4 | 6 | Gel | 88% | 0.3 |
| 21B | 59 | 40 | 7.5 | GTL 4 | 6 | Gel | 86% | 0.3 |
| 21C | 59 | 40 | 7.5 | PAO 4 | 6 | Gel | 86% | 0.4 |
| 21D | 59 | 40 | 7.5 | Star 4 | 6 | Gel | 96% | 5.7 |
| 22A | 77 | 38 | 8.0 | Yubase 4 | 6 | Gel | 93% | 1.5 |
| 22B | 77 | 38 | 8.0 | GTL 4 | 6 | Gel | 74% | 0.3 |
| 22C | 77 | 38 | 8.0 | PAO 4 | 6 | Gel | 69% | 0.3 |
| 22D | 77 | 38 | 8.0 | Star 4 | 6 | 1240 | 94% | 2.3 |
| 23A | 67 | 35 | 4.5 | Yubase 4 | 6 | 699 | 96% | 4.1 |
| 23B | 67 | 35 | 4.5 | GTL 4 | 6 | Gel | 85% | 2.4 |
| 23C | 67 | 35 | 4.5 | PAO 4 | 6 | Gel | 85% | 1.9 |
| 23D | 67 | 35 | 4.5 | Star 4 | 6 | 846 | 95% | 3.6 |
| 24A | 58 | 32 | 2.2 | Yubase 4 | 6 | 1090 | 95% | 2.4 |
| 24B | 58 | 32 | 2.2 | GTL 4 | 6 | Gel | 79% | 0.9 |
| 24C | 58 | 32 | 2.2 | PAO 4 | 6 | Gel | 86% | 1.4 |
| 24D | 58 | 32 | 2.2 | Star 4 | 6 | 1280 | 88% | 2.5 |
| 25A | 77 | 32 | 2.4 | Yubase 4 | 6 | 1220 | 93% | 2.2 |
| 25B | 77 | 32 | 2.4 | GTL 4 | 6 | 1160 | 94% | 2.3 |
| 25C | 77 | 32 | 2.4 | PAO 4 | 6 | Gel | 92% | 1.7 |
| 25D | 77 | 32 | 2.4 | Star 4 | 6 | 1110 | 92% | 2.1 |
| 26A | 83 | 26 | 2.5 | Yubase 4 | 6 | 1850 | 91% | 1.7 |
| 26B | 83 | 26 | 2.5 | GTL 4 | 6 | 1500 | 94% | 1.9 |
| 26C | 83 | 26 | 2.5 | PAO 4 | 6 | 1540 | 91% | 1.9 |
| 26D | 83 | 26 | 2.5 | Star 4 | 6 | 1790 | 90% | 1.6 |
| 26E | 83 | 26 | 2.5 | Yubase 4 | 8 | 6840 | 80% | 1.1 |
| 26F | 83 | 26 | 2.5 | GTL 4 | 8 | Gel | 82% | 0.9 |
| 26G | 83 | 26 | 2.5 | PAO 4 | 8 | Gel | 81% | 0.8 |
| 26H | 83 | 26 | 2.5 | Star 4 | 8 | 6660 | 81% | 1.1 |
| 27A* | 57 | 21 | — | Yubase 4 | 6 | Gel | 78% | 1.8 |
| 27B* | 57 | 21 | — | GTL 4 | 6 | Gel | 79% | 1.8 |
| 27C* | 57 | 21 | — | PAO 4 | 6 | Gel | 80% | 1.9 |
| 27D* | 57 | 21 | — | Star 4 | 6 | Gel | 75% | 1.6 |
| 28A* | 72 | 28 | — | Yubase 4 | 6 | Gel | 61% | 0.3 |
| 28B* | 72 | 28 | — | GTL 4 | 6 | Gel | 66% | 0.3 |
| 28C* | 72 | 28 | — | PAO 4 | 6 | Gel | 65% | 0.3 |
| 28D* | 72 | 28 | — | Star 4 | 6 | Gel | 72% | 0.3 |

*Comparative Samples (diblock copolymers)

Table 3 below shows thickening efficiencies (TEs) in the four enumerated diluent oils and the thickening efficiency span across the four enumerated diluent oils (TE span; the maximum thickening efficiency of the four diluent oils minus the minimum thickening efficiency of the four diluent oils) for each of the linear triblock copolymers of Examples 2-4 and 7-26. Also shown in Table 3 below are the viscosity indices (VIs) of each linear block copolymer in "standard" Group III basestock (Yubase 4) and in Group II basestock (Star 4).

Generally, though not for all applications, intermediate or higher individual thickening efficiencies, lower TE spans, and high or very high viscosity indices can be seen as desirable. In particular, linear triblock copolymers having a TE span of at most 0.5 or at most 0.4 and/or an average thickening efficiency in Group III diluent oil of at least 1.7 or at least 1.8 can be seen as desirable.

TABLE 3

| Sample | TE in Yubase 4 | TE in GTL 4 | TE in PAO 4 | TE in Star 4 | TE span [max-min] | VI in Yubase 4 | VI in Star 4 |
|---|---|---|---|---|---|---|---|
| 2 | 2.2 | 1.9 | 1.9 | 2.4 | 0.5 | 184 | 164 |
| 3 | 1.2 | 1.0 | 1.1 | 1.2 | 0.2 | 166 | 134 |

TABLE 3-continued

| Sample | TE in Yubase 4 | TE in GTL 4 | TE in PAO 4 | TE in Star 4 | TE span [max-min] | VI in Yubase 4 | VI in Star 4 |
|---|---|---|---|---|---|---|---|
| 4 | 3.3 | 3.0 | 2.8 | 3.5 | 0.7 | 193 | 165 |
| 7 | 2.2 | 1.9 | 1.9 | 2.4 | 0.5 | 184 | 164 |
| 8 | 2.1 | 1.9 | 1.9 | 2.3 | 0.4 | 183 | 161 |
| 9 | 2.4 | 2.2 | 2.1 | 2.6 | 0.5 | 185 | 163 |
| 10 | 1.2 | 1.0 | 1.1 | 1.2 | 0.2 | 166 | 134 |
| 11 | 1.9 | 1.8 | 1.8 | 1.6 | 0.3 | 155 | 99 |
| 12 | 2.3 | 2.0 | 2.0 | 2.2 | 0.4 | 178 | 134 |
| 13 | 2.0 | 1.8 | 1.8 | 1.7 | 0.3 | 172 | 113 |
| 14 | 2.5 | 2.3 | 2.3 | 2.3 | 0.2 | 172 | 122 |
| 15 | 2.5 | 2.4 | 2.3 | 2.2 | 0.3 | 168 | 109 |
| 16 | 2.1 | 1.9 | 1.8 | 2.2 | 0.4 | 179 | 148 |
| 17 | 1.5 | 1.3 | 1.3 | 1.4 | 0.2 | 170 | 135 |
| 18 | 3.3 | 3.0 | 2.8 | 3.5 | 0.7 | 193 | 165 |
| 19 | 2.2 | 1.9 | 1.8 | 2.4 | 0.6 | 184 | 163 |
| 20 | 2.1 | 1.7 | 1.6 | 2.3 | 0.7 | 184 | 166 |
| 21 | 1.7 | 1.3 | 1.3 | 2.0 | 0.7 | 180 | 164 |
| 22 | 2.2 | 1.8 | 1.8 | 2.6 | 0.8 | 187 | 172 |
| 23 | 2.0 | 1.5 | 1.6 | 2.4 | 0.8 | 174 | 168 |
| 24 | 1.6 | 1.2 | 1.2 | 1.9 | 0.8 | 176 | 165 |
| 25 | 2.3 | 1.8 | 1.9 | 2.4 | 0.6 | 182 | 160 |
| 26 | 2.6 | 2.2 | 2.3 | 2.8 | 0.6 | 184 | 157 |

The disclosures of all patents, articles and other materials described herein are hereby incorporated, in their entirety, into this specification by reference. A description of a composition comprising, consisting of, or consisting essentially of multiple specified components, as presented herein and in the appended claims, should be construed to also encompass compositions made by admixing said multiple specified components. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A viscosity modifier (VM) concentrate comprising:
    from about 60 parts to about 95 parts of a diluent oil; and
    from about 5 parts to about 40 parts of a linear triblock copolymer characterized by the formula:

D'-PA-D";

wherein D' represents a block derived from diene, PA represents a block derived from monoalkenyl arene, D" represents a block derived from diene, and the linear triblock copolymer is present in an amount effective to modify a lubricating kinematic viscosity at approximately 100° C. (KV100) of the concentrate,
        wherein the concentrate comprises at least 50 wt % of the diluent oil and the effective amount of the linear triblock copolymer is such that the concentrate comprises at least 6.0 wt % of the linear triblock copolymer, and
        wherein a KV100 of the diluent oil is from about 2 cSt to about 40 cSt, the KV100 of the concentrate is about 2000 cSt or less, and the concentrate has a −80° C. beaker pour of at least 87% and/or a tan δ of at least 1.8.

2. A concentrate according to claim 1, wherein the D' and D" dienes each individually comprise butadiene, isoprene, and mixtures thereof, but are not identical to each other, and wherein the D' and D" blocks are substantially hydrogenated after polymerization.

3. A concentrate according to claim 1, wherein the D' and D" dienes each individually comprise:
    (i) not more than about 3 wt % butadiene;
    (ii) at least about 97 wt % isoprene;
    (iii) both (i) and (ii).

4. A concentrate according to claim 1, wherein D' has a number average molecular weight from about 62,000 Daltons to about 150,000 Daltons, PA has a number average molecular weight from about 15,000 Daltons to about 50,000 Daltons, and D" has a number average molecular weight from about 5,000 to about 80,000 daltons.

5. A concentrate according to claim 4, wherein:
    (i) D' has a number average molecular weight from about 63,000 Daltons to about 95,000 Daltons;
    (ii) PA has a number average molecular weight from about 20,000 Daltons to about 36,000 Daltons; or
    (iii) both (i) and (ii).

6. A concentrate according to claim 4, wherein a ratio of PA number average molecular weight to a sum of D'+D" number average molecular weight is from about 0.25 to about 0.50.

7. A concentrate according to claim 4, wherein a ratio between the number average molecular weight of D' and the number average molecular weight of D" is from 1.01:1 to about 1.25:1 or from about 6.00:1 to about 20.0:1.

8. A concentrate according to claim 1, wherein the concentrate comprises from 6.0 wt % to about 13 wt % of the linear triblock copolymer.

9. A concentrate according to claim 1, wherein the diluent oil comprises a Group II, Group III, and/or Group IV basestock.

10. A concentrate according to claim 1, wherein the KV100 of the concentrate is from about 100 cSt to about 1600 cSt.

11. A concentrate according to claim 1, wherein the KV100 of the concentrate is about 1000 cSt or less.

12. A concentrate according to claim 1, further comprising one or more of an ashless dispersant, a detergent, an antiwear agent, an antioxidant, a corrosion inhibitor, a friction modifier, an antifoamant, a seal-swelling control agent, or a combination thereof.

13. A VM concentrate comprising:
    from about 60 parts to about 90 parts of a diluent oil; and
    from about 10 parts to about 40 parts of a linear triblock copolymer characterized by the formula:

D'-PA-D";

wherein D' represents a block derived from diene, PA represents a block derived from monoalkenyl arene, D" represents a block derived from diene, and the linear triblock copolymer is present in an amount effective to modify a lubricating kinematic viscosity at approximately 100° C. (KV100) of the concentrate,
        wherein the concentrate comprises at least 50 wt % of the diluent oil and the effective amount of the linear triblock copolymer is such that the concentrate comprises at least 9.5 wt % of the linear triblock copolymer, and
        wherein a KV100 of the diluent oil is from about 2 cSt to about 40 cSt, the KV100 of the concentrate is about 3000 cSt or less, and the concentrate has a 80° C. beaker pour of at least 85% and a tan δ of at least 1.5.

14. A concentrate according to claim 13, wherein the D' and D" dienes each individually comprise butadiene, isoprene, and mixtures thereof, but are not identical to each other, and wherein the D' and D" blocks are substantially hydrogenated after polymerization.

15. A concentrate according to claim 14, wherein the D' and D" dienes each individually comprise:
  (i) not more than about 3 wt % butadiene;
  (ii) at least about 97 wt % isoprene;
  (iii) both (i) and (ii).

16. A concentrate according to claim 13, wherein D' has a number average molecular weight from about 20,000 Daltons to about 60,000 Daltons, PA has a number average molecular weight from about 10,000 Daltons to about 40,000 Daltons, and D" has a number average molecular weight from about 5,000 to about 40,000 daltons.

17. A concentrate according to claim 16, wherein one or more of the following is satisfied:
  (i) D' has a number average molecular weight from about 25,000 Daltons to about 50,000 Daltons;
  (ii) PA has a number average molecular weight from about 15,000 Daltons to about 35,000 Daltons; and
  (iii) D" has a number average molecular weight from about 7,000 to about 20,000.

18. A concentrate according to claim 16, wherein a ratio of PA number average molecular weight to a sum of D'+D" number average molecular weight is from about 0.25 to about 0.50.

19. A concentrate according to claim 16, wherein a ratio between the number average molecular weight of D' and the number average molecular weight of D" is from about 1.4:1 to about 3.0:1 or from about 6.00:1 to about 20.0:1.

20. A concentrate according to claim 13, wherein the diluent oil comprises a Group II, Group III, and/or Group IV basestock.

21. A concentrate according to claim 13, wherein the KV100 of the concentrate is from about 1000 cSt to about 2000 cSt.

22. A concentrate according to claim 13, further comprising one or more of an ashless dispersant, a detergent, an anti-wear agent, an antioxidant, a corrosion inhibitor, a friction modifier, an antifoamant, a seal-swelling control agent, or a combination thereof.

23. A VM concentrate comprising:
  from about 60 parts to about 95 parts of a diluent oil; and
  from about 5 parts to about 40 parts of a linear triblock copolymer characterized by the formula:

D'-PA-D";

wherein D' represents a block derived from diene, PA represents a block derived from monoalkenyl arene, D" represents a block derived from diene, and the linear triblock copolymer exhibits a thickening efficiency span of at most 0.5 and is present in an amount effective to modify a lubricating kinematic viscosity at approximately 100° C. (KV100) of the concentrate,
  wherein the concentrate comprises at least 50 wt % of the diluent oil, and
  wherein the KV100 of the diluent oil is from about 2 cSt to about 40 cSt, the KV100 of the concentrate is about 2000 cSt or less, and the concentrate has a ~80° C. beaker pour of at least 87% and a tan δ of at least 1.8.

24. A concentrate according to claim 23, wherein the effective amount of the linear triblock copolymer is such that the concentrate comprises from 6.0 wt % to 14 wt % of the linear triblock copolymer.

25. A concentrate according to claim 23, wherein the D' and D" dienes each individually comprise butadiene, isoprene, and mixtures thereof, but are not identical to each other, and wherein the D' and D" blocks are substantially hydrogenated after polymerization.

26. A concentrate according to claim 25, wherein D' has a number average molecular weight from about 30,000 Daltons to about 95,000 Daltons, PA has a number average molecular weight from about 20,000 Daltons to about 35,000 Daltons, D" has a number average molecular weight from about 1,800 to about 60,000 daltons, and a ratio between the number average molecular weight of D' and the number average molecular weight of D" is from about 1.0:1 to about 30:1.

27. A concentrate according to claim 23, wherein the linear triblock copolymer exhibits an average thickening efficiency in Group III diluent oil of at least 1.8.

28. A concentrate according to claim 23, wherein the diluent oil comprises a Group II, Group III, and/or Group IV basestock.

29. A concentrate according to claim 28, wherein the diluent oil comprises a Group II and/or Group III basestock.

30. A concentrate according to claim 23, wherein the KV100 of the concentrate is from about 100 cSt to about 1600 cSt.

31. A concentrate according to claim 23, further comprising one or more of an ashless dispersant, a detergent, an anti-wear agent, an antioxidant, a corrosion inhibitor, a friction modifier, an antifoamant, a seal-swelling control agent, or a combination thereof.

32. A method of modifying the kinematic viscosity at approximately 100° C. (KV100) of the VM concentrate of claim 1, the method comprising adding to the concentrate an effective amount of the linear triblock copolymer characterized by the formula:

D'-PA-D";

wherein D' represents the block derived from diene, PA represents the block derived from monoalkenyl arene, D" represents the block derived from diene, and the effective amount of the linear triblock copolymer comprises at least 6.0 wt % of the concentrate while the KV100 of the concentrate is about 2000 cSt or less.

33. A method of modifying the kinematic viscosity at approximately 100° C. (KV100) of the concentrate of claim 13, the method comprising adding to the concentrate an effective amount of the linear triblock copolymer characterized by the formula:

D'-PA-D";

wherein D' represents the block derived from diene, PA represents the block derived from monoalkenyl arene, D" represents the block derived from diene, and the effective amount of the linear triblock copolymer comprises at least 9.5 wt % of the concentrate while the KV100 of the concentrate is about 3000 cSt or less.

34. A method of modifying the kinematic viscosity at approximately 100° C. (KV100) of the VM concentrate of claim 23, the method comprising adding to the concentrate an effective amount of the linear triblock copolymer characterized by the formula:

D'-PA-D";

wherein:
  D' represents the block derived from diene;
  PA represents the block derived from monoalkenyl arene;
  D" represents the block derived from diene;
  the linear triblock copolymer exhibits a thickening efficiency span of at most 0.5; and the KV100 of the concentrate containing the effective amount of the linear triblock copolymer is about 2000 cSt or less.

* * * * *

UNITED STATES PATENT AND TRADEMARK OFFICE
CERTIFICATE OF CORRECTION

| | |
|---|---|
| PATENT NO. | : 11,414,618 B2 |
| APPLICATION NO. | : 16/704078 |
| DATED | : August 16, 2022 |
| INVENTOR(S) | : Yi Zhao et al. |

It is certified that error appears in the above-identified patent and that said Letters Patent is hereby corrected as shown below:

In the Claims

Claim 13 - on Line 19, replace "has a 80° C. beaker" with "has a ~80° C. beaker"

Signed and Sealed this
Eleventh Day of October, 2022

*Katherine Kelly Vidal*
Katherine Kelly Vidal
*Director of the United States Patent and Trademark Office*